United States Patent [19]

Weil

[11] Patent Number: 4,774,391

[45] Date of Patent: Sep. 27, 1988

[54] MACHINE FOR WELDING TOGETHER THE LONGITUDINAL EDGES OF ROUNDED CAN BODIES

[75] Inventor: Wolfgang Weil, Heitersheim, Fed. Rep. of Germany

[73] Assignee: Elpatronic AG, Switzerland

[21] Appl. No.: 899,078

[22] Filed: Aug. 21, 1986

[30] Foreign Application Priority Data

Aug. 21, 1985 [CH] Switzerland ............... 3595/85

[51] Int. Cl.$^4$ .................. B23K 11/32; B23K 37/04
[52] U.S. Cl. ............................... 219/64; 219/79
[58] Field of Search ............ 219/64, 67, 79, 61.5; 198/461, 459, 577

[56] References Cited

U.S. PATENT DOCUMENTS

| | | | |
|---|---|---|---|
| 2,517,574 | 8/1950 | Jones et al. | 219/64 |
| 2,604,322 | 7/1952 | Babicz | 198/459 X |
| 3,745,295 | 7/1973 | Opprecht | 219/64 |
| 4,144,440 | 3/1979 | Schalch et al. | 219/61.5 |
| 4,257,514 | 3/1981 | Ver Mehren | 198/459 |
| 4,399,343 | 8/1983 | Muller et al. | 219/64 |
| 4,417,117 | 11/1983 | Opprecht | 219/64 |

FOREIGN PATENT DOCUMENTS

| | | |
|---|---|---|
| 143450 | 5/1985 | European Pat. Off. |
| 519371 | 4/1972 | Switzerland . |
| 621499 | 2/1981 | Switzerland . |

Primary Examiner—E. A. Goldberg
Assistant Examiner—C. M. Sigda
Attorney, Agent, or Firm—McCormick, Paulding & Huber

[57] ABSTRACT

Two endless flexible conveying strands (22, 24) run, parallel to one another, over a drive mechanism (26, 28), a guide mechanism (30, 32, 34) and a conveying track for the body blanks (10). The two conveying strands (22, 24) are displaceable in relation to one another to a limited extent in their longitudinal direction in operation. Pusher dogs (46, 48) are secured one behind the other to the conveying strands (22, 24) with equal spacing so that situated opposite each pusher dog (46) on one conveying strand (22) is a pusher dog (48) on the other conveying strand (24) so that these two associated pusher dogs together push a can body blank (10) over the conveying track to a welding apparatus (20). The pusher dogs (46, 48) each have a lateral projection (50, 52). Disposed on the conveying track, upstream of the welding apparatus (20), at a distance from this which coincides at least approximately to the length of the can body blanks (10), is a pair of adjusting templates (62, 64). The adjusting templates (62, 64) are rigidly connected to one another and can be brought into engagement with a pair of associated projections (50, 52) in order to bring these forcibly into alignment with one another in a direction transverse to the conveying track.

4 Claims, 5 Drawing Sheets

MACHINE FOR WELDING TOGETHER THE LONGITUDINAL EDGES OF ROUNDED CAN BODIES

The invention relates to a machine for welding together the longitudinal edges of rounded can bodies, having two endless flexible conveying strands or belts which run, parallel to one another, over a pair of drive wheels, a guide mechanism and a conveying track for the body blanks, pusher dogs, which are secured one behind the other, with equal spacing, on each of the conveying strands so that each pusher dog on one conveying strand is situated opposite a pusher dog on the other conveying strand in order that these two associated pusher dogs may jointly push a can body over the conveying track, and a welding apparatus on the conveying track.

Machines of this type are known, for example, from the CH-A No. 519371, the CH-A No. 621499 and the EP-A No. 0143450. The conveying strands are usually formed by plate-link chains or steel belts and are driven through a clutch which enables the conveying strands to be adjusted in relation to one another in the conveying direction so that the pusher dogs of the two conveying strands are situated opposite one another in pairs, each in a plane which extends precisely at right angles to the two conveying strands. Only if this position of the pusher dogs, associated with one another in pairs, is adhered to is it possible to ensure that the longitudinal edges of the can bodies are welded together bearing precisely against one another, that is to say not offset in relation to one another in the longitudinal direction. Only if the end edges of the can bodies each lie precisely in a plane normal to the axial direction can bodies and covers be subsequently tightly sealed without trouble.

In the known machines of the type described at the beginning, it is true that it is possible to ensure that the pusher dogs associated with one another in pairs are situated precisely opposite one another in the region of the drive wheels by adjustable couplings at driving edges of the conveying strands; this still does not necessarily mean, however, that the can bodies reach the welding apparatus in a state in which their longitudinal edges lie together without longitudinal offsetting. It is actually impossible to avoid the spacing of the pusher dogs, that is to say the distances between the successive pusher dogs, from including errors which are either due to inaccuracies in manufacture or may occur as a result of different extensions of the conveying strands in operation. Even spacing errors of the order of magnitude of a few tenths of a millimeter can lead to the fact that the welded can bodies are unusable or at any rate difficult to process further as a result of longitudinal offsetting of their longitudinal edges.

It is therefore the object of the invention to develop further a machine of the type described at the beginning, in such a manner that even at high working speeds and with heavy loading of the conveying strands, particularly as a result of intermittent operation, there is a guarantee that the longitudinal edges of the can bodies reach the welding apparatus without disturbing longitudinal offsetting.

According to the invention, the problem is solved in that the two conveying strands are displaceable to a limited extent in relation to one another in their longitudinal direction, in operation, the pusher dogs each have a lateral projection, and on the conveying track, upstream of the welding apparatus, at a distance from this which corresponds at least approximately to the length of the can bodies, a pair of adjusting templates, which are rigidly connected to one another, can be brought into engagement with a pair of associated projections in order to bring these forcibly into alignment with one another in a direction transverse to the conveying track.

The invention is based on the knowledge that what matters is not keeping the pusher dogs, associated with one another in pairs, in alignment with one another in the region of the drive mechanism as is provided for in known machines of the type in question. The only decisive thing is that the associated pusher dogs should be in alignment with one another in the transverse direction at another point more or less far away from the drive mechanism, that is to say that they should be disposed in a common plane, normal to the conveying direction; this plane must lie as accurately as possible at the length of one can from the point at which the welding apparatus welds the longitudinal edges of the can bodies together. The adjusting templates according to the invention are not responsible for driving the conveying strands; they are there exclusively to eliminate any relative longitudinal offsetting in the pusher dogs associated in pairs, in that they enforce a relative displacement of the two conveying strands with respect to one another. According to the invention, the drive of the conveying strands is of such a nature that such a relative displacement is possible.

In a preferred form of embodiment of the invention, the adjusting templates are wheels which comprise receivers, in the circumferential direction, for the projections, corresponding to the longitudinal spacing of the pusher dogs and can be driven by one of the conveying strands through a torsionally resilient coupling.

The adjusting templates may be driven in any manner, provided only that a guarantee is provided that they come into engagement with a pair of associated projections whenever these approach the point which lies upstream of the welding apparatus by the length of one can. For this purpose, the drive for the adjusting templates may be derived directly from a motor of the drive mechanism for the conveying strands. It is particularly appropriate, however, if the two adjusting templates are connected, by the torsionally resilient coupling, to an intermediate wheel which can mesh with one of the conveying strands.

It is further an advantage if the drive mechanism comprises two drive wheels, each of which can mesh with one of the conveying strands, these two drive wheels being connected to one another by a coupling which is resilient in the direction of rotation and only one of the drive wheels being rigidly coupled to a motor. The relative displacement of the conveying strands in relation to one another, necessary to compensate for spacing errors, can also be achieved, however, in that both conveying strands are each driven by their own motor.

One example of embodiment of the invention is explained with further details below, with reference to diagrammatic drawings.

The purpose of the can welding machine illustrated is to weld can body blanks 10, which consist, for example, of tin plate with a thickness of 0.2 mm, at their longitudinal edges. The can body blanks 10 have been rolled round a welding arm 12, only partially shown in FIG. 1, by a preceding rounding machine, not illustrated and travel through the welding machine in FIG. 1 from left to right.

Figure 1:
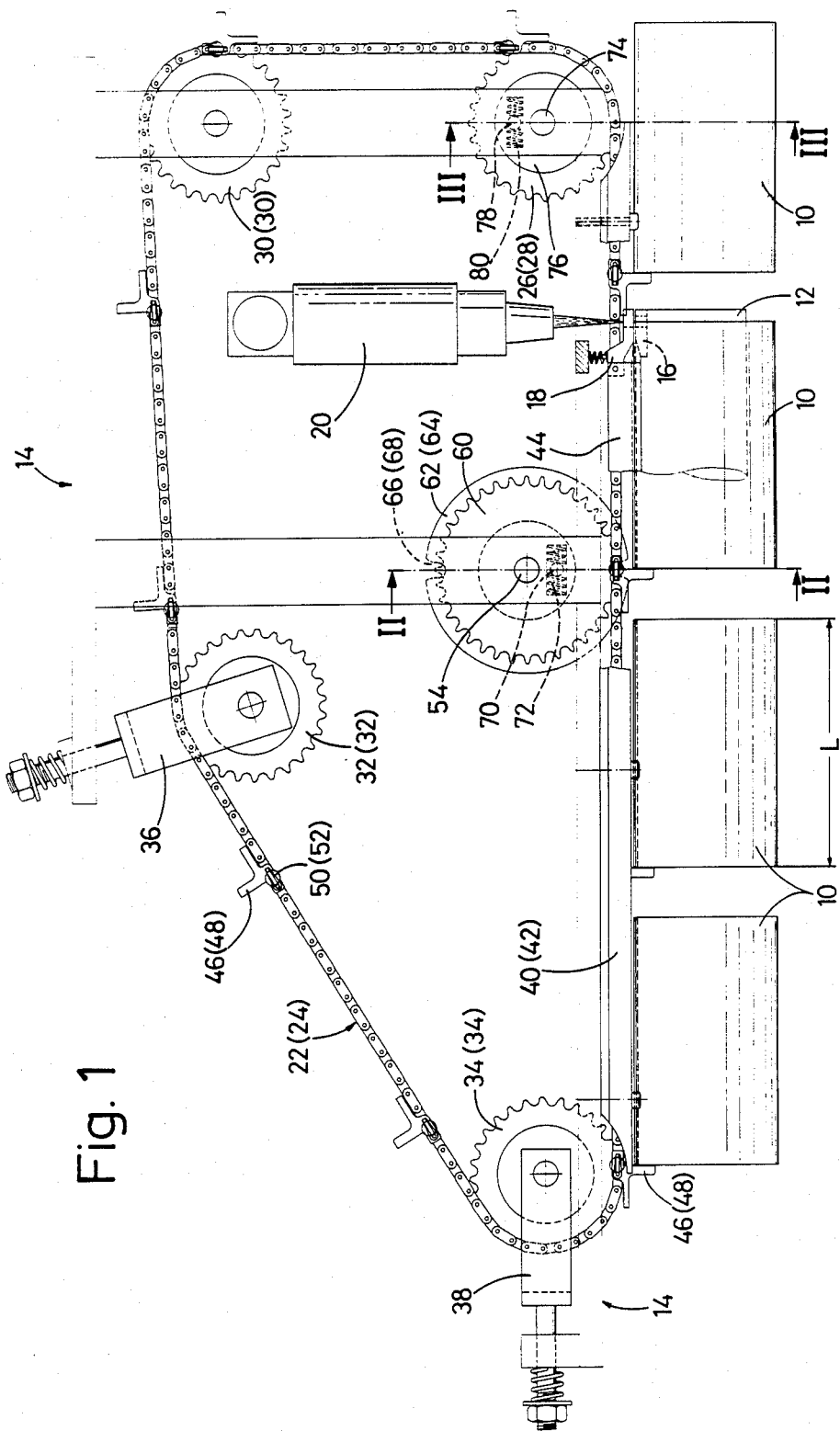
FIG. 1 shows a side view of a can welding machine.
Figure 2:
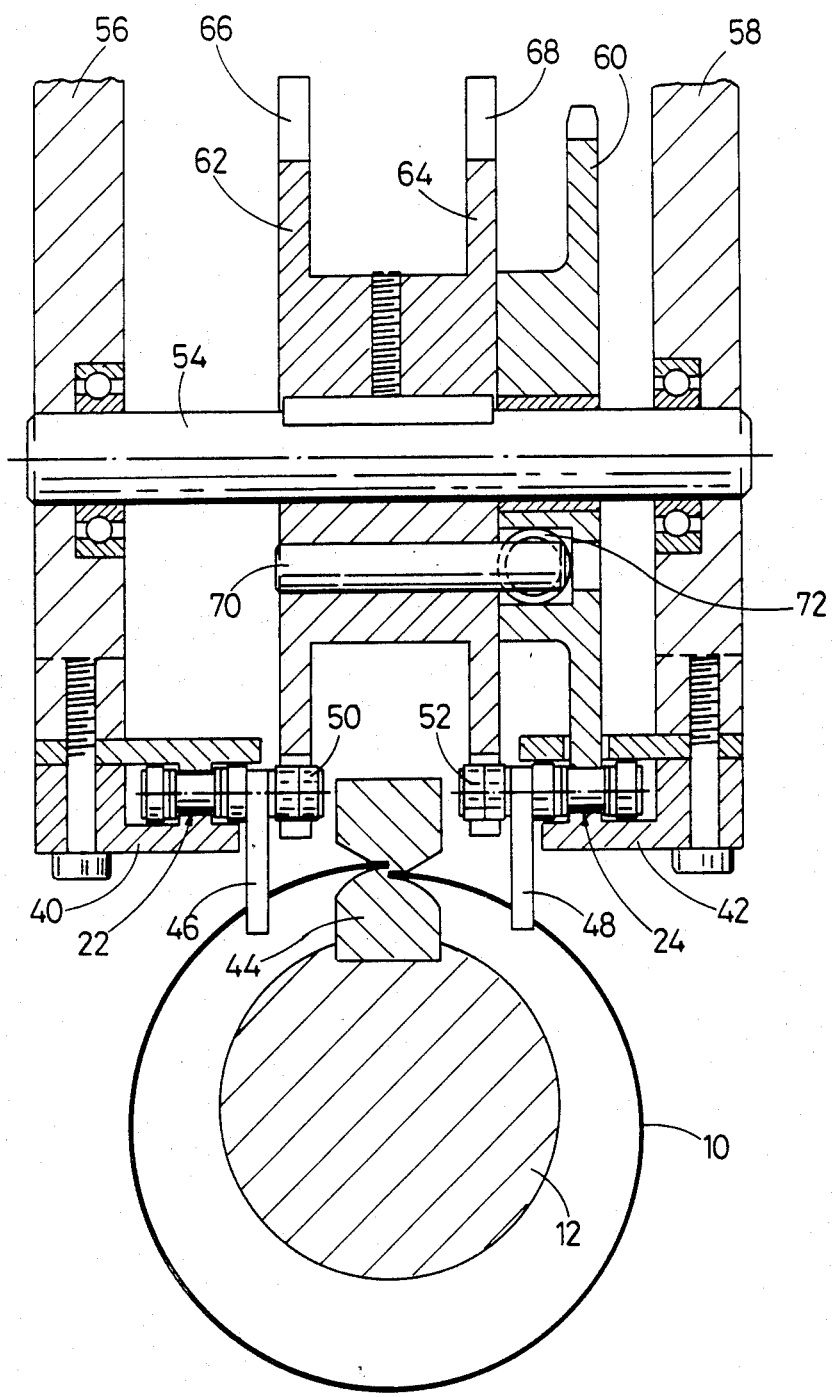
FIG. 2 shows the partial cross-section II—II in FIG. 1.

The welding arm 12 is secured to a machine frame 14 by its left-hand end, not illustrated, and projects, unsupported, away from this, towards the right in FIG. 1. Secured to the free end of the welding arm 12 is a lower guide shoe 16; associated with this is an upper guide shoe 18 which is pivotally mounted on the machine frame 14 and spring-loaded downwards. Disposed above the upper guide shoe 18 is a welding apparatus 20 which is likewise secured to the machine frame 14 and which is represented as a laser gun and transmits a vertical energy beam which welds the longitudinal edges of the can body blanks 10 together through aligned openings in the two guide shoes 16 and 18.

In order to convey the can body blanks 10, two parallel conveying strands 22 and 24 are provided which are represented as flat-link chains and each run over a drive wheel 26 or 28 and over a plurality of pairs of guide wheels 30, 32 and 34. The pairs of guide wheels 32 and 34 are each mounted on a spring-loaded tensioning device 36 or 38 as a result of which the conveying strands 22 and 24 are kept taught.

Disposed above the welding arm 12, one at each side of its vertical longitudinal centre plane are two sliding guides 40 and 42 which are secured to the machine frame 14 and so formed that they each guide one of the conveying strands 22 and 24 almost without play. Secured to the top of the welding arm 12 is a rail 44, the section of which is Z-shaped and projects into the space between the sliding guides 40 and 42. The rail 44 guides the longitudinal edges of the can body blanks 10 which are subsequently welded together.

Secured to the two conveying strands 22 and 24 constructed in the form of flat-link chains, at uniform distances apart of nine chain links in the example illustrated, are pusher dogs 46 and 48 in such a manner that a pusher dog 48 of the conveying strand 24 is situated opposite each pusher dog 46 of the conveying strand 22 in a plane extending transversely to the longitudinal direction of the conveying strands. Provided on each of the pusher dogs 46 and 48 is a lateral projection 50 or 52. These projections 50 and 52 are associated with one another in pairs in a corresponding manner to the pusher dogs 46 and 48 carrying them and extend towards one another. In the example illustrated, the projections 50 and 52 are cylindrical rollers which are each mounted on the associated conveying strand 22 or 24 for rotation about a horizontal axis.

The vertical axis of the welding apparatus 20 and of the energy beam transmitted from it lies a short distance downstream from the end of the sliding guide 40 and 42. Disposed upstream of this ax is, at a distance which corresponds precisely to the length L of the can body blanks 10, is a horizontal shaft 54 which extends at right angles to the sliding guides 40 and 42, above these, and is mounted in side cheeks 56 and 58. The cheeks 56 and 58 are secured to the machine frame 14 and carry the sliding guides 40, 42. Mounted on the shaft 54 is an intermediate wheel 60 which is constructed in the form of a sprocket wheel and meshes with the conveying strand 24 through an opening in the sliding guide 42.

Secured to the shaft 54, beside the intermediate wheel 60, are two adjusting templates 62 and 64 which are made in one piece or rigidly connected to one another. Each of the adjusting templates 62 and 64 is similar to a sprocket wheel in construction and comprises receivers 66 and 68 respectively in the form of marginal recesses, the circumferential spacing apart of which corresponds to the mutual spacing of successive pusher dogs 46 and 48 respectively. The receivers 66 and 68 of the adjusting templates 62 and 64 are aligned with one another in pairs in a direction parallel to the geometrical axis of the shaft 54 and become narrower radially inwards.

The two adjusting templates 62 and 64 are resiliently coupled to the intermediate wheel 60 by a pin 70 and two compression springs 72. The pin 70 is secured to a common hub of the adjusting templates 62 and 64 with the axes parallel and ends between the compression springs 72 in a recess in the intermediate wheel 60.

Figure 4B:
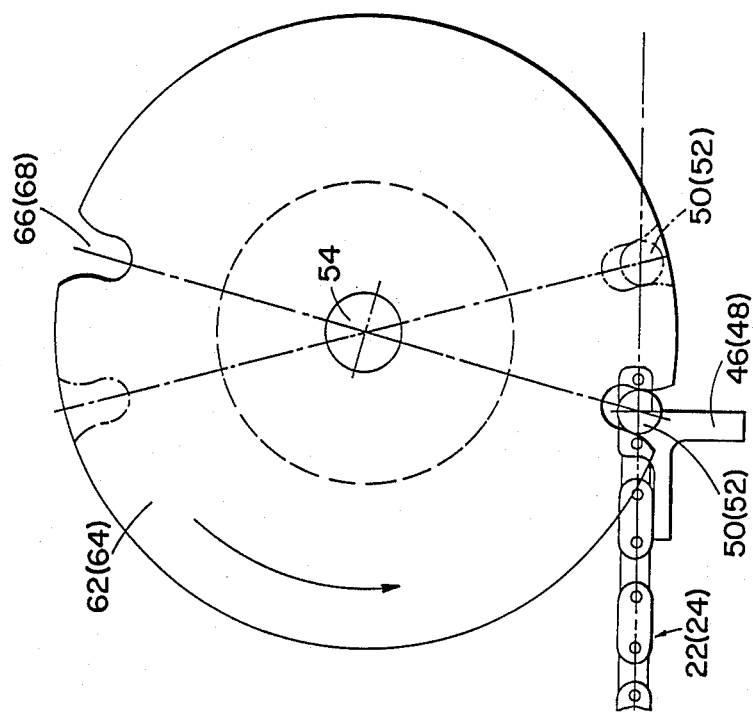
FIGS. 4a to 4c show details of FIG. 1 in various operating positions.
Figure 4A:
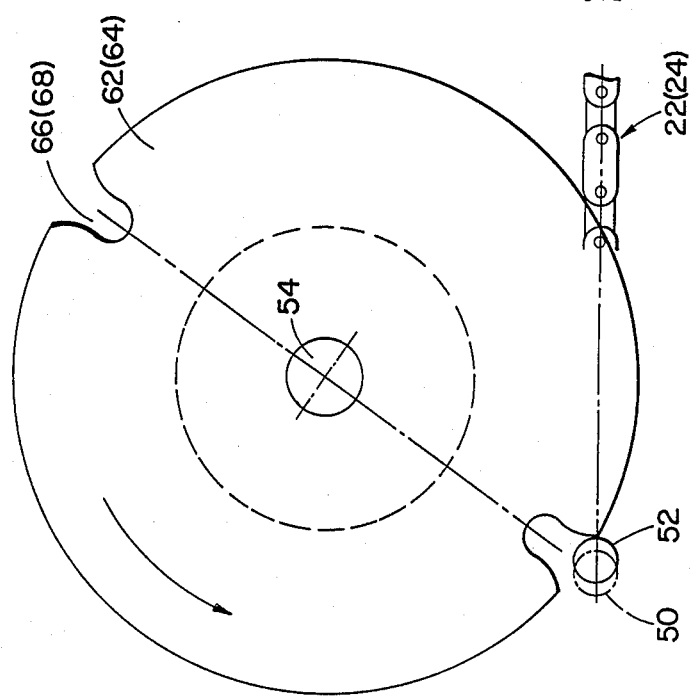
Figure 4C:
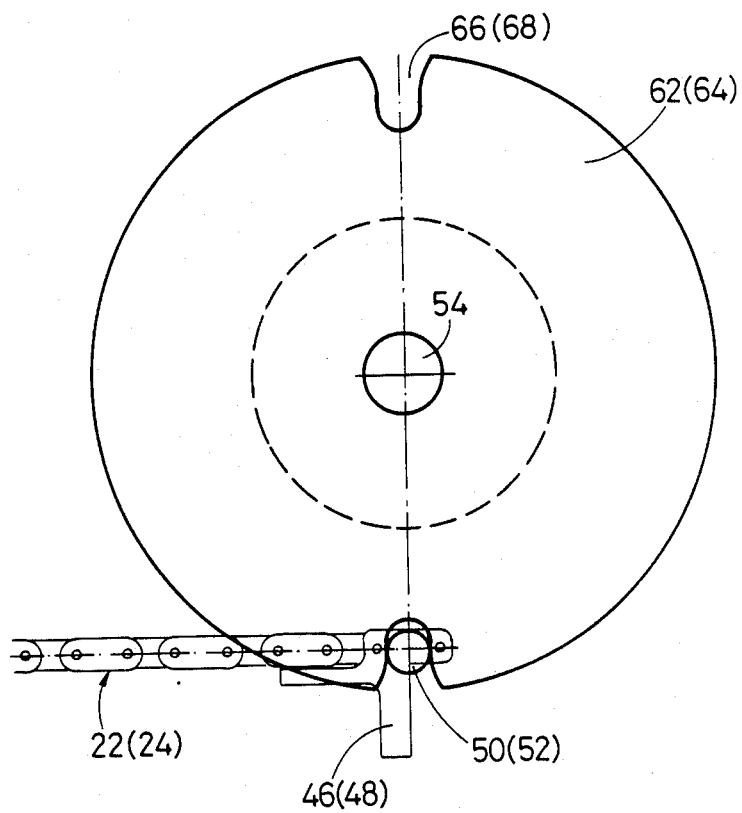

The adjusting templates 62 and 64 rotate counter clockwise in FIGS. 4c, 4b and 4c with the intermediate wheel 60 to the extent that the conveying strands 22 and 24 are moved forwards in such a manner that the receivers 66 and 68 each reliably grasp one of the projections 50 or 52 respectively as shown in FIG. 4a and then, on further forward movement of the conveying strands 22 and 24, gradually accommodate said projection 50, 52 without play as shown in FIG. 4b, at lower left until associated projections 50 and 52, and hence also the associated pusher dogs 46 and 48, are precisely adjusted with respect to one another (FIG. 4c).

When a pair of pusher dogs 46, 48 assumes the position shown in FIGS. 1 and 4c, the front edge of the can body blank 10, against the rear edge of which these two pusher dogs are pushing, lies precisely in the plane which is normal, to the sliding guides 40 and 42 and in which the center axis of the welding apparatus 20 lies. Thus, at this moment, the longitudinal edges of the can body blank 10 in question begin to be welded together. During further progressive forward movement of the two conveying strands 22 and 24, the said two projections 50 and 52 gradually leave the receivers 66 and 68 in which they have been adjusted; this next step after welding is indicated by broken lines in FIG. 4b at lower right.

If the two conveying strands 22 and 24 have spacing errors, one of the two projections 50 and 52 released by the receivers 66 and 68 is displaced and hence the associated pusher dogs 46 and 48 are also displaced again in relation to one another; this is harmless, however, because the welding of the can body blank 10 in question has now progressed so far that its longitudinal edges can no longer be displaced in relation to one another.

The actions described are repeated through the action of the adjusting templates 62 and 64 on the following projections 50 and 52 with the result that the following can body blank 10 also comes within the working range of the welding apparatus 20 with its longitudinal edges precisely in alignment with one another.

Each adjustment of a pair of associated pusher dogs 46 and 48 is combined with a relative longitudinal displacement of the conveying strands 22 and 24 in their portions adjacent to the adjusting templates 62 and 64.

The drive of the conveying strands 22 and 24 must be of such a nature that it renders this relative longitudinal displacement possible.

Figure 3:
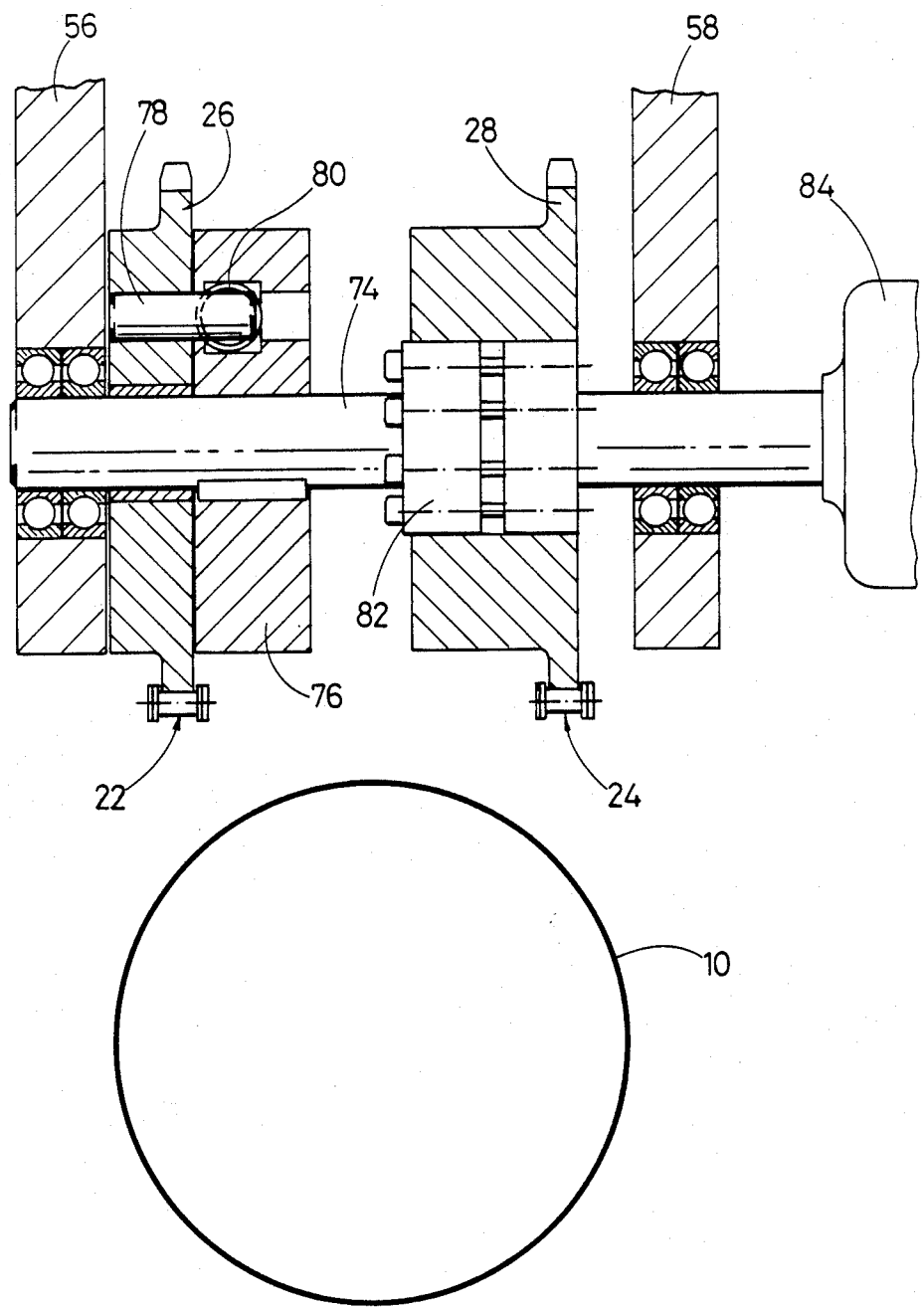
FIG. 3 shows the partial cross-section III—III in FIG. 1.

In the example of embodiment illustrated, this is achieved in accordance with FIG. 3 in that the drive wheel 26 is mounted for rotation on a drive shaft 74 to which a hub member 76 is secured. Drive wheel 26 and hub member 76 are connected to one another by a torsionally resilient coupling which is formed, in accordance with the one described above, from a pin 78 and a pair of compression springs 80. The pin 78 is secured to the drive wheel 26 and extends parallel to its axis into a recess in the hub member 76 where it ends between the compression springs 80 which are disposed along a chord of the hub member 76 and are supported on this. The other drive wheel 28 is connected, by a coupling 82, which is adjustable but rigid in operation, to the drive shaft 74 which in turn is connected to a motor 84.

I claim:

1. A machine for welding longitudinal edges of rounded can body blanks (10), said machine comprising:
   two endless flexible conveying strands (22,24) which run, parallel to one another, over a drive mechanism (26, 28), a guide mechanism (30, 32, 34) and a track for conveying body blanks (10),
   a plurality of pusher dogs (46, 48) secured sequentially to each of said conveying strands (22, 24) at spaced intervals so that each pusher dog (46) on one conveying strand (22) is sequentially registered with a corresponding pusher dog (48) on the other conveying strand (24) so that these two associated pusher dogs together push a can body blank (10) over the conveying track, and
   a welding apparatus (20) on the conveying track characterized in that
   the two conveying strands (22, 24) are displaceable to a limited extent in relation to one another in their longitudinal direction, in operation,
   the pusher dogs (46, 48) each have a lateral projection (50, 52) and
   on the conveying track, upstream of the welding apparatus (20) at a distance corresponding approximately to the length of a can body blank (10), a pair of adjusting templates (62, 64), which are rigidly connected to one another, are brought into engagement with a pair of pusher dog lateral projections (50, 52) to automatically bring said projections (50, 52) forcibly into alignment with one another in a direction transverse to the conveying track.

2. A machine as claimed in claim 1, characterized that the adjusting templates (62, 64) are wheels which comprise, at circumferential distances apart corresponding to the longitudinal spacing of the pusher dogs (46, 48), receivers (66, 68) for the projections (50, 52) and can be driven by one of the conveying strands (24) through a torsionally resilient coupling (70, 72).

3. A machine as claimed in claim 2, characterized in that the two adjusting templates (62, 64) are connected, by the torsionally resilient coupling (70, 72) to an intermediate wheel (60) which can mesh into one of the conveying strands (22, 24).

4. A machine as claimed in claim 1 the drive mechanism of which comprises two drive wheels (26, 28) which can each mesh into one of the conveying strands (22, 24), characterized in that the two drive wheels (26, 28) are connected to one another by a coupling (68, 80) which is resilient in the direction of rotation and only one of the drive wheels (28) is rigidly coupled to a motor (84).

* * * * *